United States Patent [19]

Rector, Jr.

[11] Patent Number: 5,450,300
[45] Date of Patent: Sep. 12, 1995

[54] LIGHTING DEVICE
[75] Inventor: James A. Rector, Jr., Dallas, Tex.
[73] Assignee: Airport Lighting Systems, Inc., Dallas, Tex.
[21] Appl. No.: 251,613
[22] Filed: May 31, 1994
[51] Int. Cl.[6] .............................................. E01F 9/00
[52] U.S. Cl. ................................. 362/153.1; 362/285; 362/366; 362/418
[58] Field of Search ...................... 362/152, 153, 153.1, 362/62, 365, 366, 431, 285, 418, 457, 382

[56] References Cited

U.S. PATENT DOCUMENTS

| | | | |
|---|---|---|---|
| 2,038,506 | 4/1936 | Cadieux | 362/153 |
| 3,007,034 | 10/1961 | Reed et al. | 362/153 |
| 4,343,033 | 8/1982 | Suzuki | 362/153 |
| 5,068,773 | 11/1991 | Toth | 362/153.1 |
| 5,335,151 | 8/1994 | Dahlberg | 362/153.1 |

Primary Examiner—Ira S. Lazarus
Assistant Examiner—Alan B. Cariaso
Attorney, Agent, or Firm—Harry C. Post, III

[57] ABSTRACT

A device for providing light along a runway or taxiway at an airport. A base receptacle is adapted to be positioned along the runway and has an open end. A sleeve member is movably received within the base receptacle and has a sleeve member passageway. Replaceable light fixture connecting apparatus is used to connect a light fixture to the sleeve member. Sleeve member connecting apparatus selectively connects the sleeve member to the base receptacle at varying positions.

17 Claims, 4 Drawing Sheets

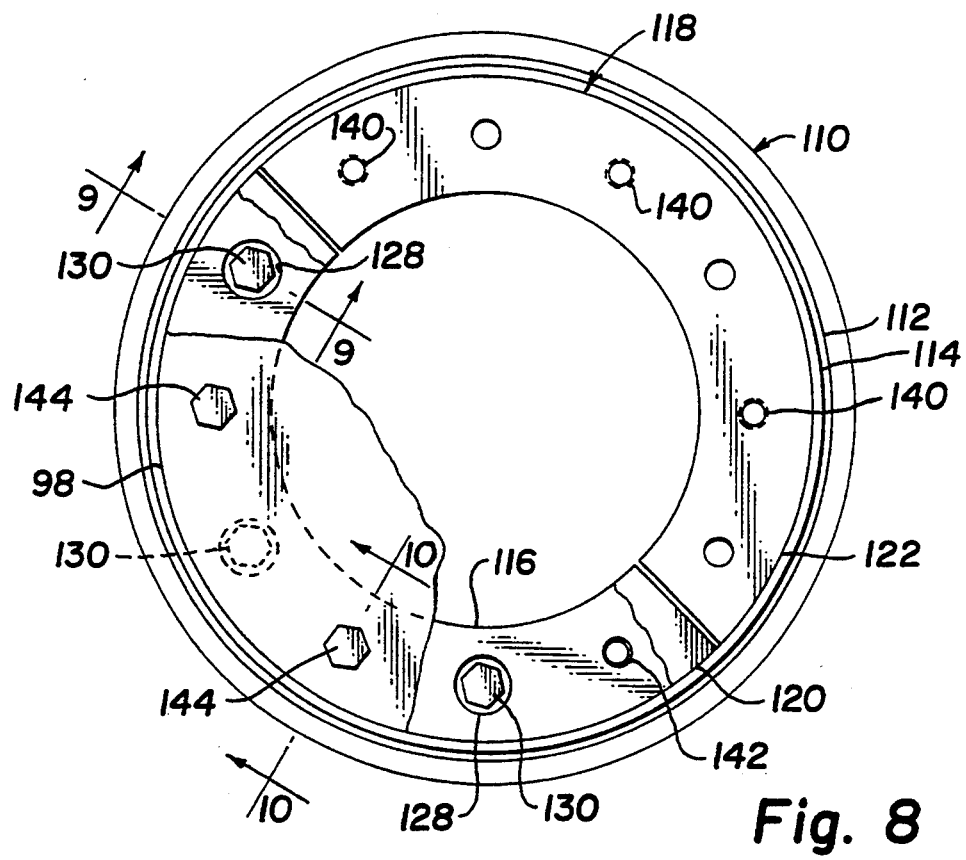
Fig. 8
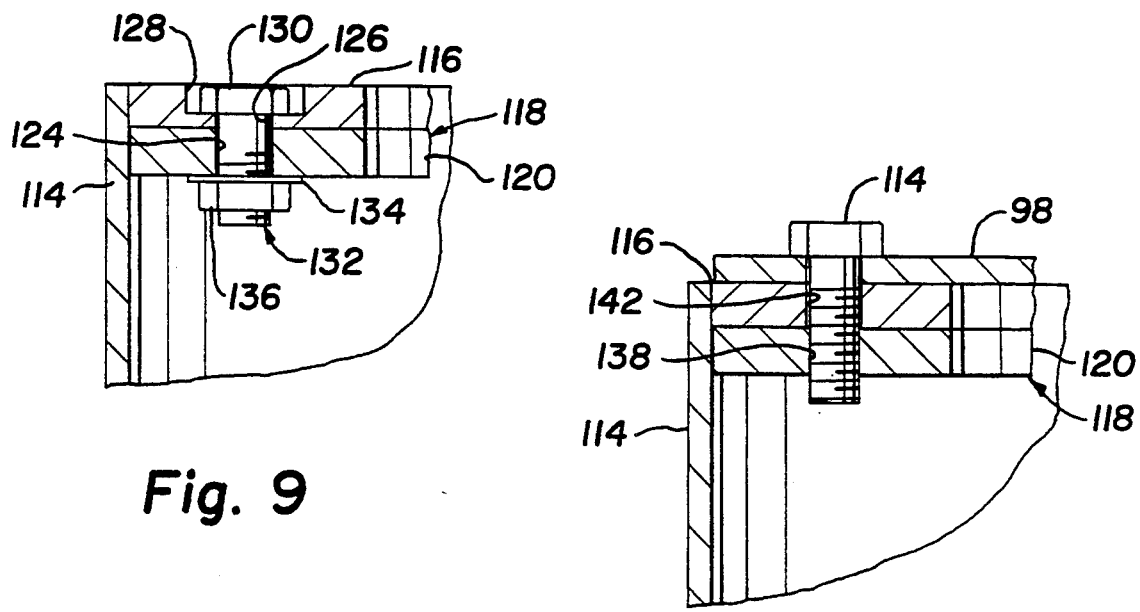
Fig. 9
Fig. 10

LIGHTING DEVICE

TECHNICAL FIELD

This invention relates to a device for providing light along a runway or a taxiway all an airport and, more particularly, to a non-load bearing light base used with a lighting fixture that is disposed along such runway or taxiway.

BACKGROUND ART

The use of lighting devices at airports to illuminate the runways or taxiways is well known. Each lighting device employs a light fixture supported by a base, which may be classified as load bearing or non-load bearing. The typical non-load bearing base includes an open ended base receptacle adapted to be positioned along the runway or taxiway. A sleeve member with a sleeve member passageway allows access into the base receptacle is connected by set screws threaded through its sidewalls to the base receptacle. A threaded flange member is disposed on top of the sleeve member and secured to the sleeve member at its top. The threaded flange member has a thru hole member body with a plurality of removable fixture connecting passageways to which a plurality of mud plate connecting bolts or light fixture connecting bolts are threadedly engaged.

The lighting base is provided along the runway or a taxiway by embedding within the concrete the base receptacle with a mud plate attached. The base receptacle is embedded within the concrete to a depth where the mud plate is positioned at about the same level as the upper surface of the concrete. After the upper surface of the concrete is paved, the paving material, such as tar, is removed above the mud plate and the mud plate removed from the base receptacle by unscrewing the connecting bolts from engagement with the thru hole connecting body. The sleeve member is then moved upwardly until its upper edge is generally aligned with the upper surface of the paving material and fastened in position by rotating the set screws into engagement with the side walls of the base receptacle. After being fastened in position, concrete is used to fill in the space around the raised sleeve member to securely fasten the base in position. A plate to which a light fixture is fastened is then connected by bolts to the threaded flange member.

Since the lighting device is accessible to the weather, rust forms on the bolts. Should it become necessary to replace the light fixture, such as frequently occurs late at night or early in the morning, the bolts must be removed. During removal of the bolts, they are frequently broken. When such bolts break, it becomes necessary to remove the broken bolt from the threaded flange member before the light fixture can be reattached to its base. To remove the broken bolt from the threaded flange member, the broken bolt is drilled out of the removable fixture connecting passageway and such passageway tapped. Since this repair or replacement normally occurs during dark hours and at remote locations along the runway, it is imperative that such replacement be done as quickly as possible in whatever weather conditions.

Accordingly, it is an object of the present invention to provide a lighting device that allows a lighting fixture to be quickly and easily repaired or replaced.

Further, it is an object of the present invention to provide a lighting device that allows a lighting fixture base to be quickly and easily repaired.

Further, it is an object of the present invention to provide a lighting device that is quickly and easily adjusted as to height while such device is being installed along the runway or taxiway.

Further, it is an object of the present invention to provide a lighting device that allows a lighting fixture to be quickly and easily repaired or replaced on a preexisting lighting device that has been previously installed along the runway.

Further, it is an object of the present invention to provide a lighting device that allows a lighting fixture base to be quickly and easily repaired on a pre-existing lighting device that has been previously installed along the runway or taxiway.

DISCLOSURE OF THE INVENTION

In accordance with the present invention there is provided a device for providing light along a runway or taxiway at an airport. A base receptacle is adapted to be positioned along the runway and has an open end and a sleeve member that has a sleeve member passageway allowing access through the open end into the base receptacle. A sleeve member connecting apparatus selectively connects the sleeve member to the base receptacle. A thru hole member is disposed within the sleeve member passageway and secured to the sleeve member and includes a thru hole member body, which has a plurality of removable member connecting passageways. A removable fixture member has a fixture member body with a plurality of removable fixture connecting passageways. The plurality of removable member connecting passageways in the fixture member body are aligned with the connecting passageways in the thru hole member body. A plurality of bolts extend through the removable member connecting passageways in the thru hole member body and the fixture member body to secure the removable fixture member to the thru hole member. Light fixture connecting apparatus connects a light fixture to the removable fixture member.

Further, in accordance with the present invention there is provided a device for providing light along a runway or taxiway at an airport. A base receptacle is adapted to be positioned along the runway and has a bottom, walls connected to and extending upwardly from the bottom and an open end. A sleeve member having side walls is movably received within the walls of the base receptacle. Light fixture connecting apparatus connects a light fixture to the sleeve member. Sleeve member connecting apparatus selectively connects the sleeve member to the base receptacle and includes adjustment means for selective connecting the sleeve member to the base receptacle at a location chosen relative to the bottom. The adjustment apparatus includes a height adjustment guide having an elongated body with a slot provided along its length, a lower end attached to a wall of the base receptacle and an upper end extending upwardly away from the lower end, and a stud connected to and extending away from the wall of the sleeve member and through the slot provided along the length of the height adjustment guide.

BRIEF DESCRIPTION OF THE DRAWINGS

Other objects and advantages of the invention will become apparent upon reading the following detailed description and upon reference to the drawings, wherein like reference characters are used throughout to designate like parts:

FIG. 8 is a plain view, partly in section, of a second embodiment of a lighting device constructed in accordance with the present invention;

FIG. 9 is a view of the lighting device shown in FIG. 8 taken along line 9—9 in the direction of the arrows; and FIG. 10 is a view of the lighting device shown in FIG. 8 taken along line 10—10 in the direction of the arrows.

BEST MODE FOR CARRYING OUT THE INVENTION

Figure 1:
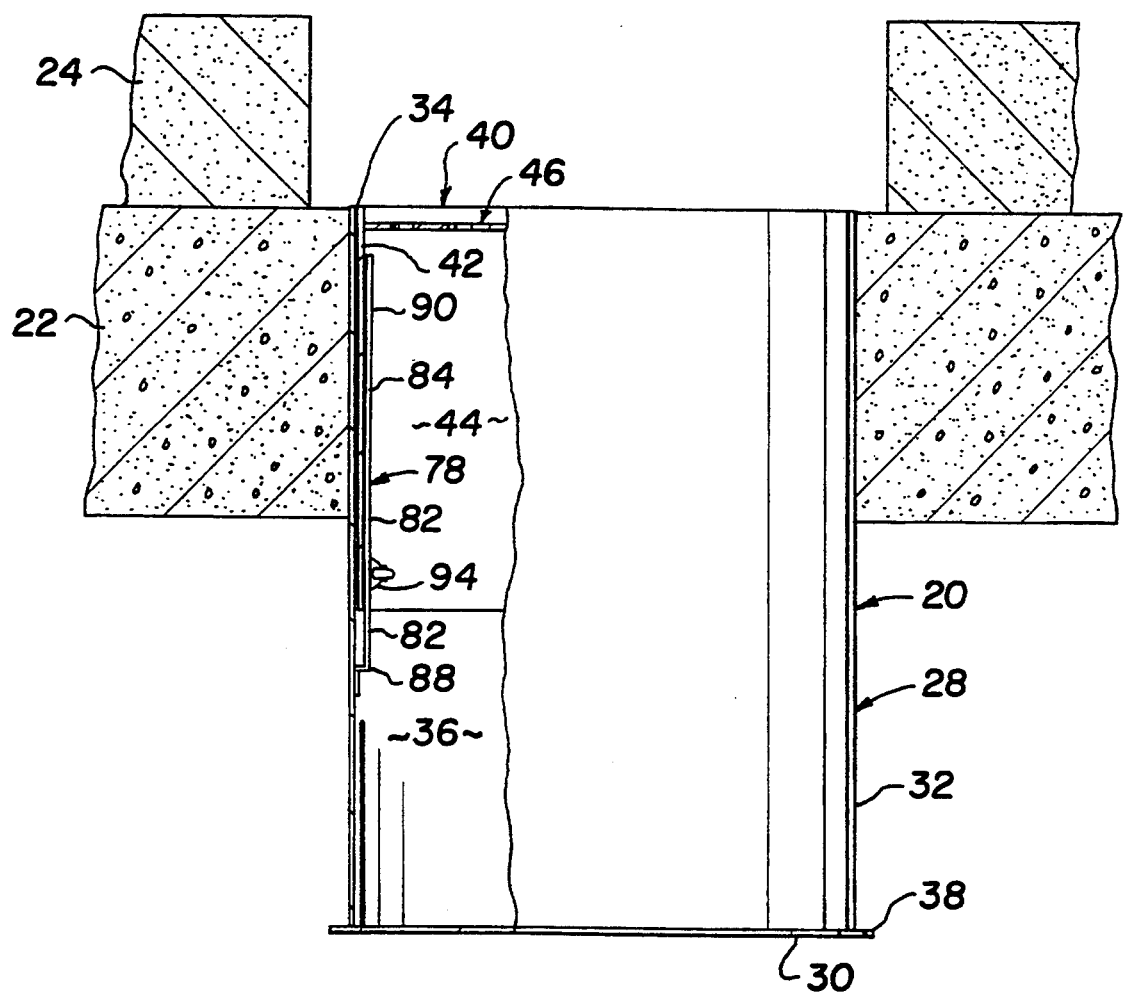
FIG. 1 is an elevational view, partly in section, of a lighting device constructed in accordance with the present invention with the device disposed in a first position.
Figure 2:
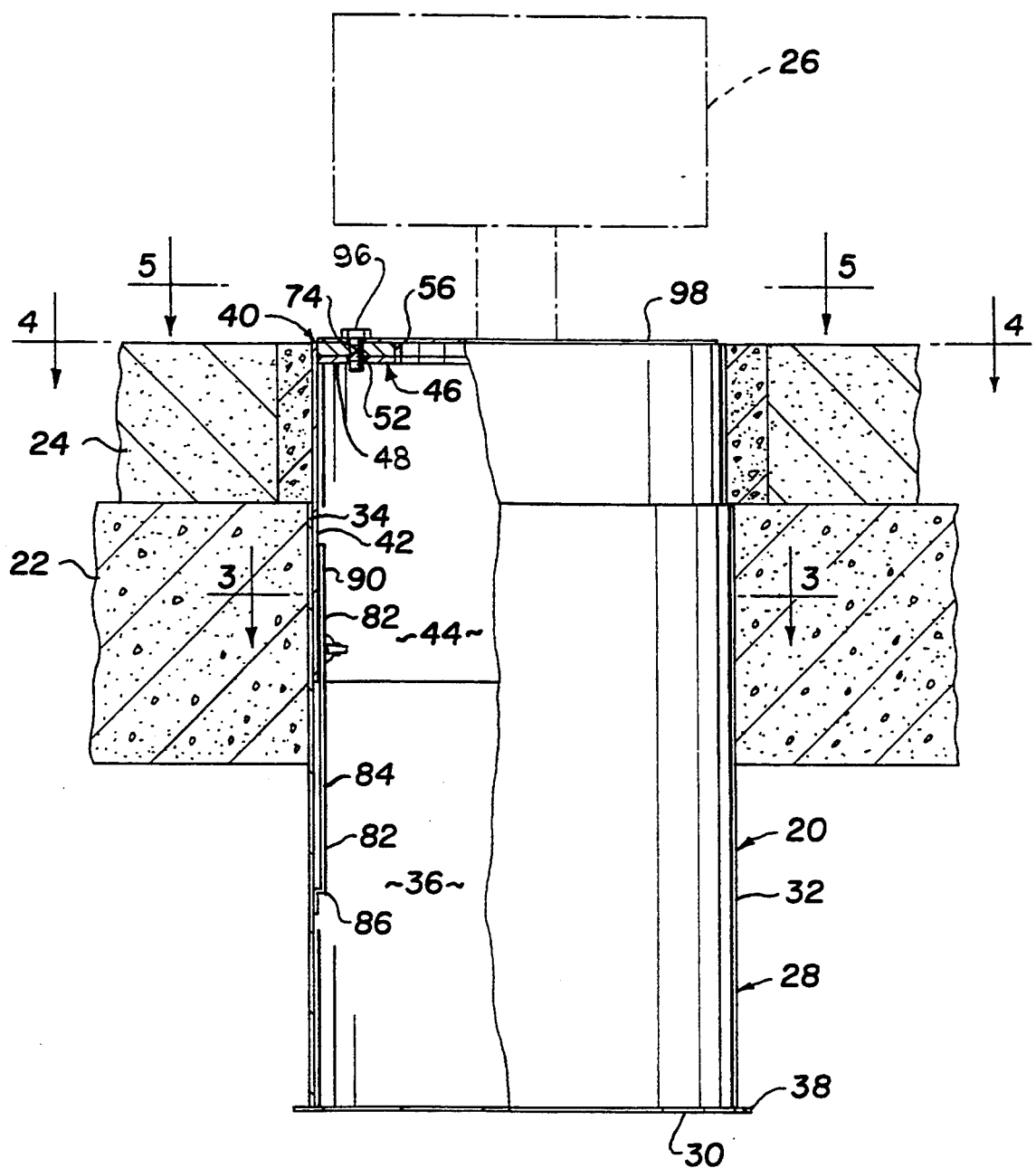
FIG. 2 is an elevational view of the lighting device shown in FIG. 1 with the device disposed in a second position.

Turning now to FIGS. 1 and 2, there is shown a device 20 for providing light along a runway or taxiway at an airport. As with prior art devices, device 20 is embedded within a layer of concrete 22 and a layer of conventional paving material 24. FIG. 1 illustrates device 20 in its installation position and after the paving material has been removed to permit access to device 20 and FIG. 2 illustrates device 20 in its operational position with a conventional lighting fixture 26 shown in dotted outline.

Device 20 includes a base receptacle 28 adapted to be positioned along the runway and embedded within concrete 22. Base receptacle 28 has a bottom 30, tubular side walls 32 connected to and extending upwardly from the bottom and an open end 34 communicating with an interior 36 of receptacle 28. Bottom 30 extends exteriorly of tubular side walls 32 by a distance sufficient to form a shoulder 38.

A sleeve member 40 is complementarily received within receptacle 28 of device 20 in its installation position. Member 40 has tubular side walls 42 forming a passageway 44 allowing access through open end 34 into interior 36 of base receptacle 28 and is movably received within side walls 32 of base receptacle 28.

Figure 6:
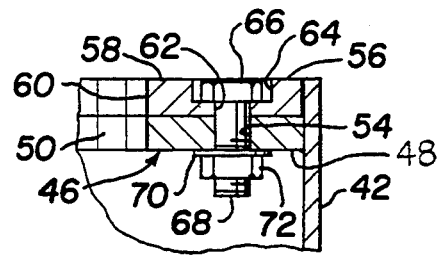
FIG. 6 is a view of a portion of the lighting device shown in FIG. 4 taken along line 6—6 in the direction of the arrows.
Figure 3:
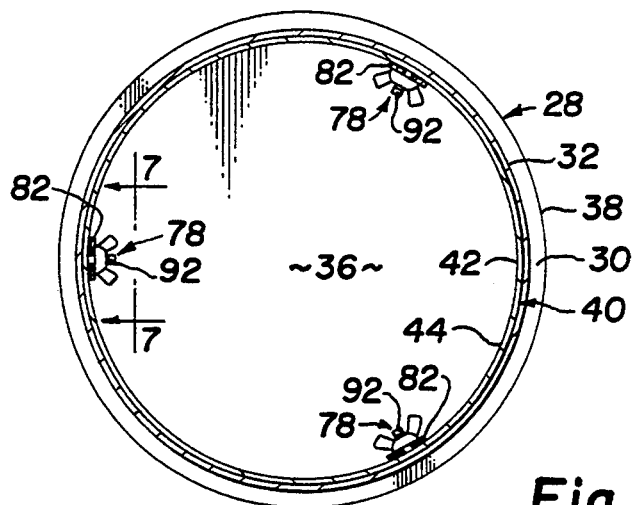
FIG. 3 is a plan view of the lighting device shown in FIG. 2 taken along line 3—3 in the direction of the arrows.

A thru hole member 46 in the shape of a ring, as best seen in FIGS. 1, 2 and 6, is disposed within sleeve member passageway 44 and secured to side walls 42 of sleeve member 40 near its access or upper end and includes a thru hole ring body 48. Thru hole ring 46 has an access passageway 50, a plurality, preferably 6 as best seen in FIG. 4, of connecting passageways 52 and a plurality, preferably 6 as best seen in FIG. 4, and a plurality of removable ring connecting passageways 54 preferably 6 as best seen in FIG. 4.

Figure 4:
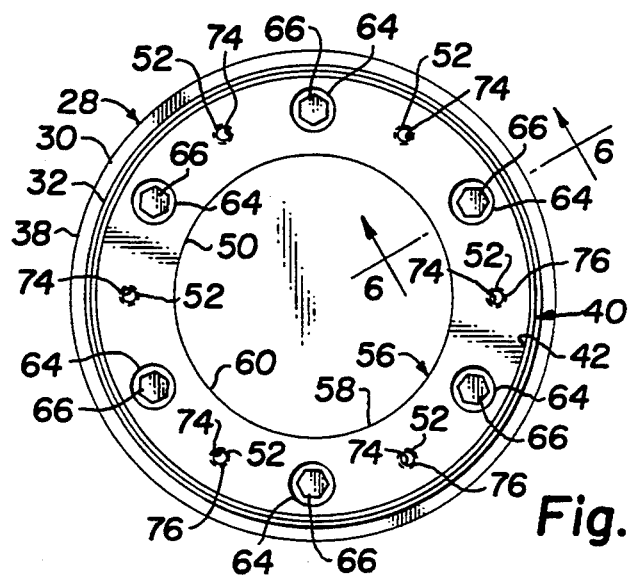
FIG. 4 is a plan view of the lighting device shown in FIG. 2 taken along line 4—4 in the direction of the arrows.
Figure 7:
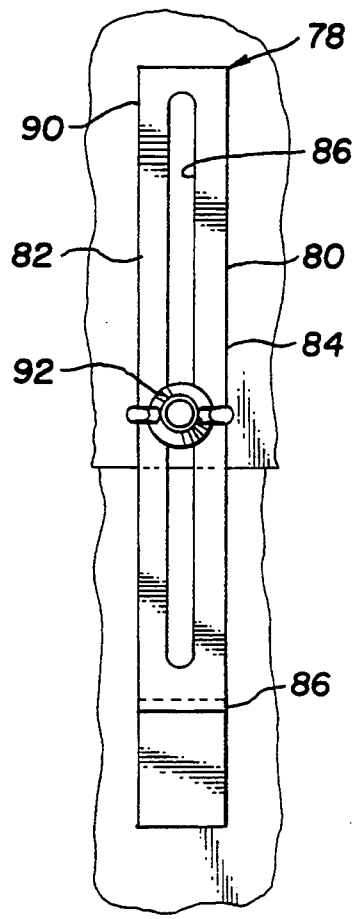
FIG. 7 is a view of a portion of the lighting device shown in FIG. 3 taken along line 7—7 in the direction of the arrows.

A removable fixture member 56 in the shape of a ring, as best seen in FIGS. 2, 4 and 6, is disposed within sleeve member passageway 44 and includes a fixture ring body 58. Fixture ring body 58 has an access passageway 60 aligned with access passageway 50 of thru hole body 46 to permit access through open end 34 into interior 36 of base receptacle 28.

As best seen in FIGS. 4 and 6, a plurality of removable ring connecting passageways 62 is included in fixture ring body 58. Each one of the plurality of removable ring connecting passageways 62 in fixture ring body 58 is aligned with a removable ring connecting passageway 54 in thru hole ring body 48. A countersink 64, preferably bored, is disposed around each of the plurality of removable ring connecting passageways 62 sufficient to receive a head 66 of a bolt 68. Plurality of bolts 68 extend through removable ring connecting passageways 52 in thru hole ring body 48 and removable ring connecting passageways 62 in fixture ring body 58. A lock washer 70 is disposed around each bolt 68 and a nut 72 is threadedly connected to each bolt 68 to urge fixture ring 58 into engagement with thru hole ring 46.

As best seen in FIGS. 2 and 4, a plurality of fixture connecting passageways 74 is included in fixture ring body 58. Each one of the plurality of fixture connecting passageways 74 in fixture ring body 58 is aligned with a fixture connecting passageway 52 in thru hole ring body 48 and are provided with threads 76.

As best seen in FIGS. 1-3 and 7, an adjustable sleeve member connecting apparatus 78 is used to selectively connect sleeve member 40 to base receptacle 28. Sleeve member connecting apparatus 78 includes an adjustment device 80 for selectively connecting sleeve member 40 to base receptacle 28 at a location chosen relative to and above bottom 30. The chosen location is where the upper edge of sleeve member 40 is generally aligned with the surface of paving material 24, as shown in FIG. 2. Adjustment device 80 includes at least three height adjustment guides 82 disposed equidistant around tubular side walls 32 of base receptacle 28.

Each height adjustment guide 82 has an elongated body 84 with a slot 86 provided along its elongated length. An L-shaped lower end 88 of each guide 82 is attached, such as by spot welding, to wall 32 of base receptacle 28 and a free born upper end 90 extends upwardly away from lower end 88 toward open end 34. A screw stud 92 for each guide 82 is connected to and extends away from wall 42 of sleeve member 40 and through slot 86 provided along the length of the respective height adjustment guide 82. A wing nut 94 is threadedly connected to each stud 92 and urges each height adjustment guide 82 into engagement with wall 42 of sleeve member 40. After the upper edge of sleeve member 40 is generally aligned with the surface of paving material 24 and secured by the connecting apparatus 78, any opening around sleeve member 40 is filled in with concrete as shown in FIG. 2.

Figure 5:
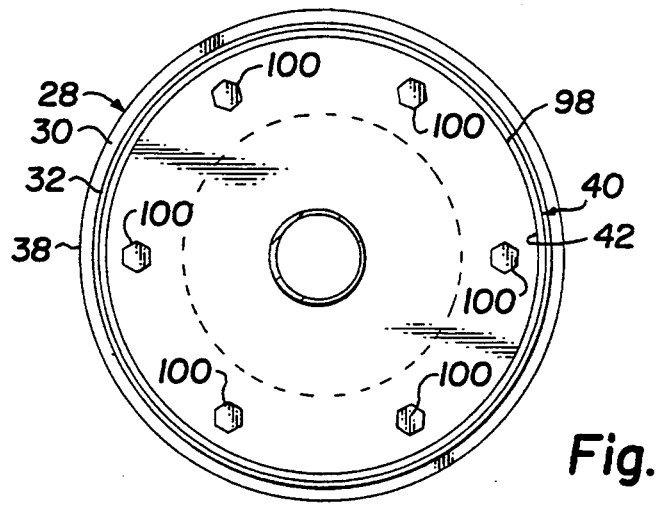
FIG. 5 as a plan view of the lighting device shown in FIG. 2 taken along line 5—5 in the direction of the arrows.

As best seen in FIGS. 2 and 5, a light fixture connecting apparatus 96 is used to connect lighting fixture 26, which includes a plate 98, to removable ring 56. Light fixture connecting apparatus 96 uses a plurality of bolts 100, preferably 6, to engage threads 76 provided in fixture connecting passageways 74 in fixture ring body 58 and urge plate 98 into engagement with fixture ring body 58.

In operation, lighting device 20 is embedded within concrete 22 with a mud plate connected by bolts to removable fixture ring body 56. After paving material layer 24 has been added, the portion of layer 24 above device 20 is removed and the mud plate disconnected from ring body 56. If necessary wing units 94 are rotated to release adjustment device 80, sleeve member 40 is then raised to a position above bottom 30 by a distance sufficient to position the upper edge of sleeve member 40 to about the same height as the upper surface of the layer of paving material 24. The user reaches through thru hole access passageway 50, removable fixture ring body access passageway 60 and sleeve member passageway 44 to wing nuts 94. Wing nuts 94 are rotated into engagement with height adjustment guides 82 to secure sleeve member 40 at the chosen height. Additional concrete is added around sleeve member 40 to securely embed lighting device 20. Plate 98 of lighting fixture 26 is properly located on removable fixture member 56 and attached by bolts 100.

Should lighting fixture 26 become inoperable and a repair man breaks a bolt 100 when attempting to remove fixture 26, removable fixture member 56 is removed from thru hole ring 46 by removing bolts 68 which are protected inside device 20 from inclement weather. A new removable fixture member 56 is attached to thru hole ring 46 and bolts 100 are used to secure plate 98 of lighting fixture 26 to new removable fixture member 56. The previously used removable fixture member may then be taken to another location for removing any broken bolts.

When sufficient space does not exist to allow thru hole ring body 48 to be positioned within sleeve member 40 and between the thru hole ring and the upper edge of sleeve member 40, then a second embodiment 110 of the invention, as best seen in FIGS. 8–10, may be used.

Second embodiment 110 has a base receptacle 112, a sleeve member 114 movably connected to base receptacle 112 and a thru hole ring member 116 connected to sleeve member 114 in close juxtaposition relative to its top edge.

A removable fixture ring member 118 is used to connect plate 98 of the light fixture apparatus to sleeve member 114. It has been discovered that in order to place removable fixture ring member 118 on the side of thru hole member 116 facing away from the open end of base receptacle 112, it is necessary for removable fixture ring member 118 to be constructed of first and second halves. Accordingly, removable fixture ring member 118 consists of first half 120 and second half 122.

As best seen in FIGS. 8 and 9, a plurality of removable ring connecting passageways 124 are included in each half 120 and 122 of fixture ring 118. Each one of the plurality of removable ring connecting passageways 124 is aligned with a removable ring connecting passageway 126 in thru hole ring body 116. A countersink 128, preferably bored, is disposed around each of the plurality of removable ring connecting passageways 126 in thru hole ring 116 with sufficient depth and diameter to receive a head 130 of a bolt 132. Plurality of bolts 132 passes through movable ring connecting passageways 126 in thru hole ring body 116 and movable ring connecting passageways 124 in fixture ring body 118. A lock washer 134 is disposed around each bolt 132 and a nut 136 is threadedly connected to each bolt 132 to draw fixture ring 118 into engagement with thru hole ring 116.

As best seen in FIGS. 8 and 10, a plurality of fixture connecting passageways 138 are included in each half 120 and 122 of fixture ring 118 and are provided with threads 140. Each fixture connecting passageway 138 is aligned with a fixture connecting passageways 142 thru hole ring body 116. To fasten plate 98 of the light fixture to removable fixture ring member 118, a plurality of bolts 144 pass through fixture connecting passageways 142 in thru hole ring body 116 and engage threads 140 in fixture connecting passageways 138 in fixture ring body 118.

In the event a pre-existing non-load bearing light base used with a lighting fixture is used, first half 120 and second half 122 of removable ring member 118 should be connected to thru hole member 116 by bolts 332. After this installation, should lighting fixture 26 become inoperable and a repair man break a bolt 144 when attempting to remove fixture 26, removable fixture member 118 is removed from thru hole ring 116 by removing bolts 132 and a new removable fixture member 118 or first or second half 120 and 122, respectively, attached to thru hole ring 116. The previously used removable fixture member may then be taken to another location for removing the broken bolt.

The invention having been described, what is claimed is:

1. A device for providing light along a runway at an airport, comprising: a base receptacle adapted to be positioned along the runway, said base receptacle having an open end; a sleeve member having a sleeve member passageway allowing access through the open end into said base receptacle; sleeve member connecting means for selectively connecting said sleeve member to said base receptacle; a thru hole member disposed within the sleeve member passageway and secured to said sleeve member, said thru hole member including a thru hole member body having a plurality of removable member connecting passageways; a removable fixture member including a fixture member body having a plurality of removable fixture connecting passageways; the plurality of removable member connecting passageways in the fixture member body being aligned with the connecting passageways in the thru hole member body; a plurality of bolts extending through the removable member connecting passageways in the thru hole member body and the fixture member body to secure said removable fixture member to said thru hole member; and light fixture connecting means for connecting a light fixture to said removable fixture member, the fixture member body being disposed adjacent said thru hole member on a side facing toward the open end of said base receptacle.

2. A device, as set forth in claim 1, further comprising: the thru hole member body further having an access passageway: and the fixture member body further having an access passageway, the access passageway in the fixture member body being aligned with the access passageway in the thru hole body to permit access through the open end of said base receptacle.

3. A device, as set forth in claim 1, further comprising: a nut threadedly connected to each one of the plurality of bolts for urging the fixture member body into engagement with the thru hole member body.

4. A device, as set forth in claim 3, further comprising the thru hole member body further having an access passageway; and the fixture member body further having an access passageway, the access passageway in the fixture member body being aligned with the access passageway in the thru hole body to permit access to each nut threadedly connected to the plurality of bolts.

5. A device, as set forth in claim 1, further comprising: said light fixture connecting means having a plurality of bolts for engaging threads provided in the fixture connecting passageways in the fixture member body.

6. A device, as set forth in claim 1, further comprising: the fixture member body further having a countersink disposed around each of the plurality of connecting passageways, each countersink being sufficiently deep to receive a head of each of said plurality of bolts.

7. A device for providing light along a runway at an airport, comprising: a base receptacle adapted to be positioned along the runway, said base receptacle having an open end; a sleeve member having a sleeve member passageway allowing access through the open end into said base receptacle: sleeve member connecting means for selectively connecting said sleeve member to said base receptacle; a thru hole member disposed within the sleeve member passageway and secured to said sleeve member, said thru hole member including a thru hole member body having a plurality of removable member connecting passageways; a removable fixture member including a fixture member body having a plurality of removable fixture connecting passageways: the plurality of removable member connecting passageways in the fixture member body being aligned with the connecting passageways in the thru hole member body; a plurality of bolts extending through the removable member connecting passageways in the thru hole member body and the fixture member body to secure said removable fixture member to said thru hole member: and light fixture connecting means for connecting a light fixture to said removable fixture member, said sleeve member connecting means including adjustment means for selectively connecting said sleeve member to said base receptacle at a location chosen relative to a bottom of said base receptacle.

8. A device, as set forth in claim 7, further comprising: said sleeve member further having a wall; and the adjustment means including a height adjustment guide having an elongated body with a slot provided along its length, a lower end attached to a wall of said base receptacle and an upper end extending upwardly away from the lower end, and a stud connected to and extending away from the wall of said sleeve member and through the slot provided along the length of the height adjustment guide.

9. A device, as set forth in claim 8, further comprising: the adjustment means further including a wing nut threadedly connected to the stud for urging the height adjustment guide into engagement with the wall of said sleeve member.

10. A device for providing light along a runway at an airport, comprising: a base receptacle adapted to be positioned along the runway, said base receptacle having an open end; a sleeve member having a sleeve member passageway allowing access through thee open end into said base receptacle; sleeve member connecting means for selectively connecting said sleeve member to said base receptacle a thru hole member disposed within the sleeve member passageway and secured to said sleeve member, said thru hole member including a thru hole member body having a plurality of removable member connecting passageways: a removable fixture member including a fixture member body having a plurality of removable fixture connecting passageways; the plurality of removable member connecting passageways in the fixture member body being aligned with the connecting passageways in the thru hole member body: a plurality of bolts extending through the removable member connecting passageways in the thru hole member body and the fixture member body to secure said removable fixture member to said thru hole member: and light fixture connecting means for connecting a light fixture to said removable fixture member, said base receptacle having a bottom and tubular side walls connected to and extending upwardly from the bottom; said sleeve member further having tubular side walls complimentarily disposed relative to the tubular side walls of said base receptacle; said connecting means including adjustment means for selectively connecting said sleeve member to said base receptacle at a location chosen relative to a bottom of said base receptacle, the adjustment means including at least three height adjustment guides disposed equidistant around the tubular side walls of said base receptacle.

11. A device for providing light along a runway at an airport, comprising: a base receptacle adapted to be positioned along the runway, said base receptacle having an open end; a sleeve member having a sleeve member passageway allowing access through the open end into said base receptacle: sleeve member connecting means for selectively connecting said sleeve member to said base receptacle: a thru hole member disposed within the sleeve member passageway and secured to said sleeve member, said thru hole member including a thru hole member body having a plurality of removable member connecting passageways: a removable fixture member including a fixture member body having a plurality of removable fixture Connecting passageways: the plurality of removable member connecting passageways in the fixture member body being aligned with the connecting passageways in the thru hole member body: a plurality of bolts extending through the removable member connecting passageways in the thru hole member body and the fixture member body to secure said removable fixture member to said thru hole member: and light fixture connecting means for connecting light fixture to said removable fixture member, the thru hole member body further having an access passageway; and said removable fixture member further including the fixture member body having first and second portions, each portion being adapted to move through the access passageway provided in the thru hole member body.

12. A device, as set forth in claim 11, further comprising: the fixture member body being disposed adjacent said thru hole member on a side facing away from the open end of said base receptacle.

13. A device for providing light along a runway at an airport, comprising: a base receptacle adapted robe positioned along the runway, said base receptacle having a bottom, walls connected to and extending upwardly from the bottom and an open end; a sleeve member having side walls movably received within the walls Of said base receptacle: light fixture connecting means for connecting a light fixture to said sleeve member: sleeve member connecting means for selectively connecting said sleeve member to said base receptacle, said sleeve member connecting means including adjustment means for selective connecting said sleeve member to said base receptacle at a location chosen relative to the bottom, the adjustment means including a height adjustment guide having an elongated body with a slot provided along its length, a lower end attached to a wall of said base receptacle and an upper end extending upwardly away from the lower end, and a stud connected to and extending away from the wall of said sleeve member and through the slot provided along the length of the height adjustment guide, the adjustment means further including a wing nut threadedly connected to the stud for urging the height adjustment guide into engagement with the wall of said sleeve member.

14. A device for providing light along a runway at an airport, comprising: a base receptacle adapted to be positioned along the runway, said base receptacle having a bottom, walls connected to and extending upwardly from the bottom and an open end: a sleeve member having side walls movably received within the walls of said base receptacle; light fixture connecting means for connecting a light fixture to said sleeve member; sleeve member connecting means for selectively connecting said sleeve member to said base receptacle, said sleeve member connecting means including adjustment means for selective connecting said sleeve member to said base receptacle at a location chosen relative to the bottom, the adjustment means including a height adjustment guide having an elongated body with a slot provided along its length, a lower end attached to a wall of said base receptacle and an upper end extending upwardly away from the lower end, and a stud connected to and extending away from the wall of said sleeve member and through the slot provided along the length of the height adjustment guide, the adjustment means further including at least three height adjustment guides disposed equidistant around the tubular side walls of said base receptacle, a stud for each guide connected to and extending away from the wall of said sleeve member and through the slot provided along the length of the respective height adjustment guide and a wing nut threadedly connected to each stud for urging the height adjustment guide into engagement with the wall of said sleeve member.

15. A device for providing light along a runway at an airport, comprising: a base receptacle adapted to be positioned along the runway of the airport, said base receptacle having a bottom, tubular side walls connected to and extending upwardly from the bottom and an open end: a sleeve member having tubular side walls forming a passageway allowing access through the open end into said base receptacle and movably received within the side walls of said base receptacle; a thru hole ring disposed within the sleeve member passageway and secured to said sleeve member, said thru hole ring including a thru hole ring body having an access passageway, a plurality of connecting passageways and a plurality of removable ring connecting passageways, a removable fixture ring disposed within the sleeve member passageway including a fixture ring body having an access passageway, the access passageway in the fixture ring body being aligned with the access passageway in the thru hole body to permit access through the open end of said base receptacle, a plurality of removable ring connecting passageways, the plurality of removable ring connecting passageways in the fixture ring body being aligned with the removable ring connecting passageways in the thru hole ring body, a countersink disposed around each of the plurality of removable ring connecting passageways sufficient to receive a head of a bolt, and a plurality of fixture connecting passageways, the plurality of fixture ring connecting passageways in the fixture ring body being aligned with the fixture ring connecting passageways in the thru hole ring body; a plurality of bolts extending through the movable ring connecting passageways in the thru hole ring body and the fixture ring body; a nut threadedly connected to each one of the plurality of bolts for urging said fixture ring into engagement with said thru hole ring; sleeve member connecting means for selectively connecting said sleeve member to said base receptacle, said sleeve member connecting means including adjustment means for selectively connecting said sleeve member to said base receptacle at a location chosen relative to the bottom, the adjustment means including at least three height adjustment guides disposed equidistant around the tubular side walls of said base receptacle, each height adjustment guide having an elongated body with a slot provided along its length, a lower end attached to a wall of said base receptacle and an upper end extending upwardly away from the lower end, a stud for each guide connected to and extending away from the wall of said sleeve member and through the slot provided along the length of the respective height adjustment guide, and a wing nut threadedly connected to each stud for urging the height adjustment guide into engagement with the wall of said sleeve member; and light fixture connecting means for connecting a light fixture to said removable ring, said light fixture connecting means having a plurality of bolts for engaging with threads provided in the fixture connecting passageways in the fixture ring body.

16. A device, as set forth in claim 15, further comprising: the fixture ring body being disposed adjacent said thru hole ring on a side facing away from the open end of said base receptacle.

17. A device, as set forth in claim 15, further comprising: the fixture ring body being disposed adjacent said thru hole ring on a side facing toward the open end of said base receptacle.

* * * * *